United States Patent [19]

Tamura et al.

[11] Patent Number: 5,770,785
[45] Date of Patent: Jun. 23, 1998

[54] APPARATUS AND METHOD FOR REMOVING CARBON DIOXIDE CONTAINED IN EXHAUST GAS

[75] Inventors: Masataka Tamura, Kawasaki; Yutaka Ishiwata, Zushi; Yoshiyasu Itoh, Yokohama, all of Japan

[73] Assignee: Kabushiki Kaisha Toshiba, Kawasaki, Japan

[21] Appl. No.: 88,738

[22] Filed: Jul. 8, 1993

[30] Foreign Application Priority Data

Jul. 9, 1992 [JP] Japan .................................. 4-181443
Jun. 10, 1993 [JP] Japan .................................. 5-138641

[51] Int. Cl.$^6$ .................................................. B09B 3/00
[52] U.S. Cl. .................. 588/900; 588/243; 422/186; 250/492.3; 204/157.3; 204/157.4; 204/157.41; 204/157.5; 204/157.9
[58] Field of Search .............. 204/157.3, 157.4, 204/157.41, 157.47, 157.5, 157.9; 588/243, 900; 250/492.3; 422/186

[56] References Cited

U.S. PATENT DOCUMENTS

| | | | |
|---|---|---|---|
| 3,845,317 | 10/1974 | Lindwall et al. | 422/186 |
| 4,012,301 | 3/1977 | Rich et al. | 422/186 |
| 4,451,342 | 5/1984 | Lichtin et al. | 204/157.47 |
| 4,882,020 | 11/1989 | Maezawa et al. | 204/157.3 |
| 4,952,231 | 8/1990 | Kaneko et al. | 204/157.3 |
| 5,031,401 | 7/1991 | Hinderks | 60/302 |
| 5,319,211 | 6/1994 | Matthews et al. | 250/492.3 |
| 5,357,291 | 10/1994 | Schonberg et al. | 250/492.3 |

FOREIGN PATENT DOCUMENTS

| | | |
|---|---|---|
| 0 408 772 | 1/1991 | European Pat. Off. . |
| 459471A | 12/1991 | European Pat. Off. . |
| 2 223 313 | 10/1974 | France . |
| 63-302924 | 12/1963 | Japan . |
| 0105625 | 8/1980 | Japan . |
| 61-164627 | 7/1986 | Japan . |
| 62-250933 | 10/1987 | Japan . |

*Primary Examiner*—Robert J. Hill, Jr.
*Assistant Examiner*—C. Delacroix-Muirheid
*Attorney, Agent, or Firm*—Oblon, Spivak, McClelland, Maier & Neustadt, P.C.

[57] ABSTRACT

A hydrogen source and carbon dioxide are activated by irradiating a high energy beam onto the hydrogen source formed of hydrogen gas and/or a gaseous hydrogen compound, and onto exhaust gas containing carbon dioxide. The carbon dioxide contained in the exhaust gas is reduced by the activated hydrogen in order to transform the carbon dioxide into a solid or liquid compound and then recover it. It is preferable to dispose mesh materials for promoting the reduction reaction with the carbon dioxide in the exhaust gas in multiple layers within the reaction container. The size of the aperture of the mesh materials is set so as to gradually decrease in the direction of the flow of the mixed gas. It is also preferable to form the cross-sectional area of the reaction container so as to gradually decrease in the direction of the flow of the mixed gas. By the method for removing carbon dioxide, carbon dioxide contained in the exhaust gas can be removed at a high reaction speed without heating or pressurizing the exhaust gas. In addition, reaction products are industrially useful materials, and the exhaust gas can be recovered in the form of a readily recoverable liquid or solid material.

15 Claims, 11 Drawing Sheets

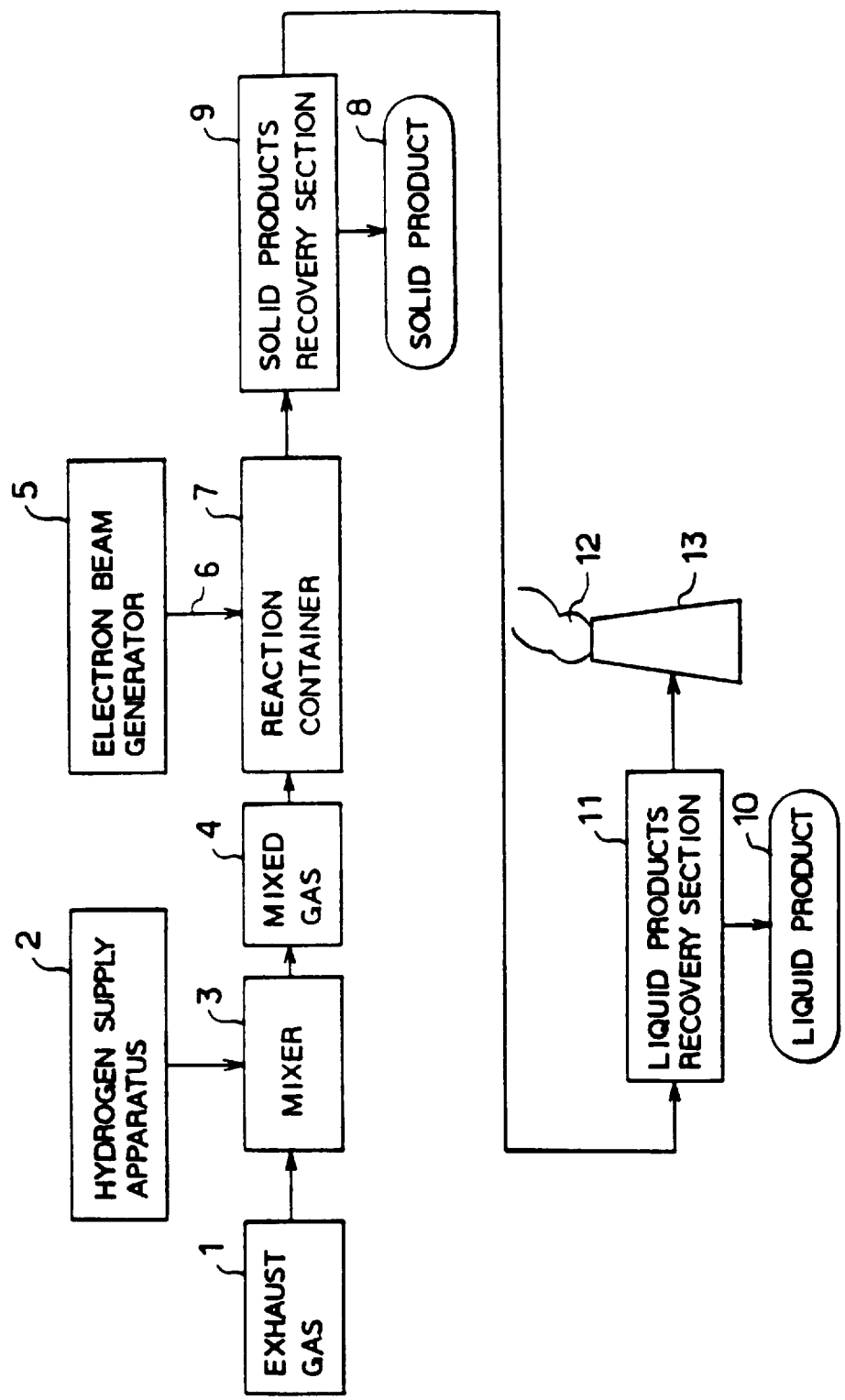
F I G. 1

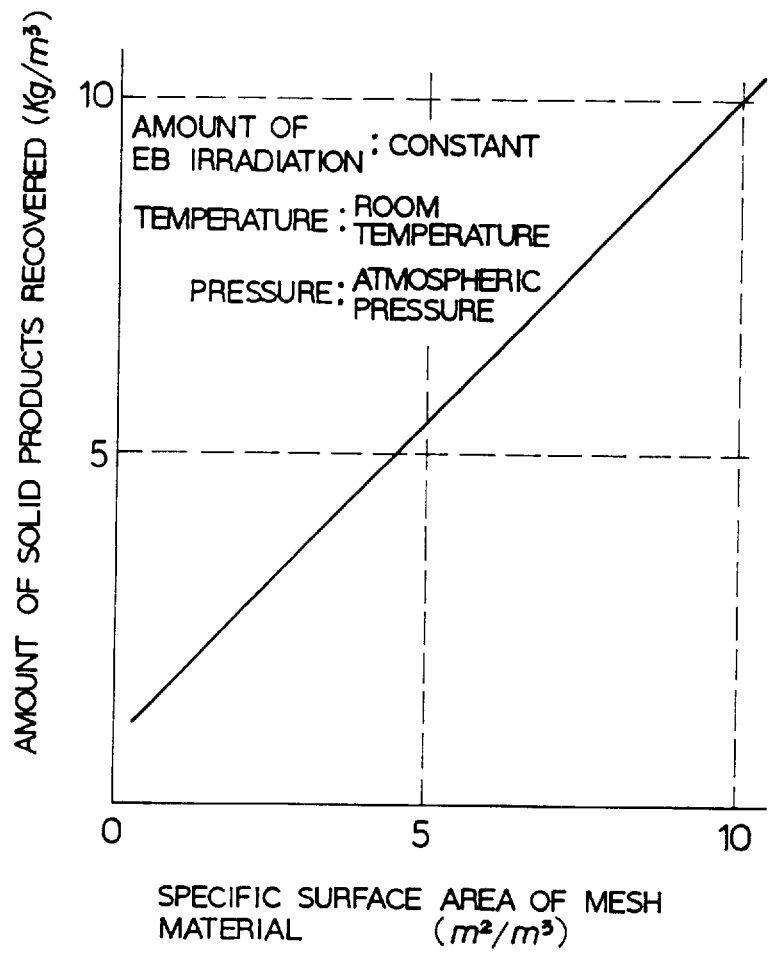
F I G. 10

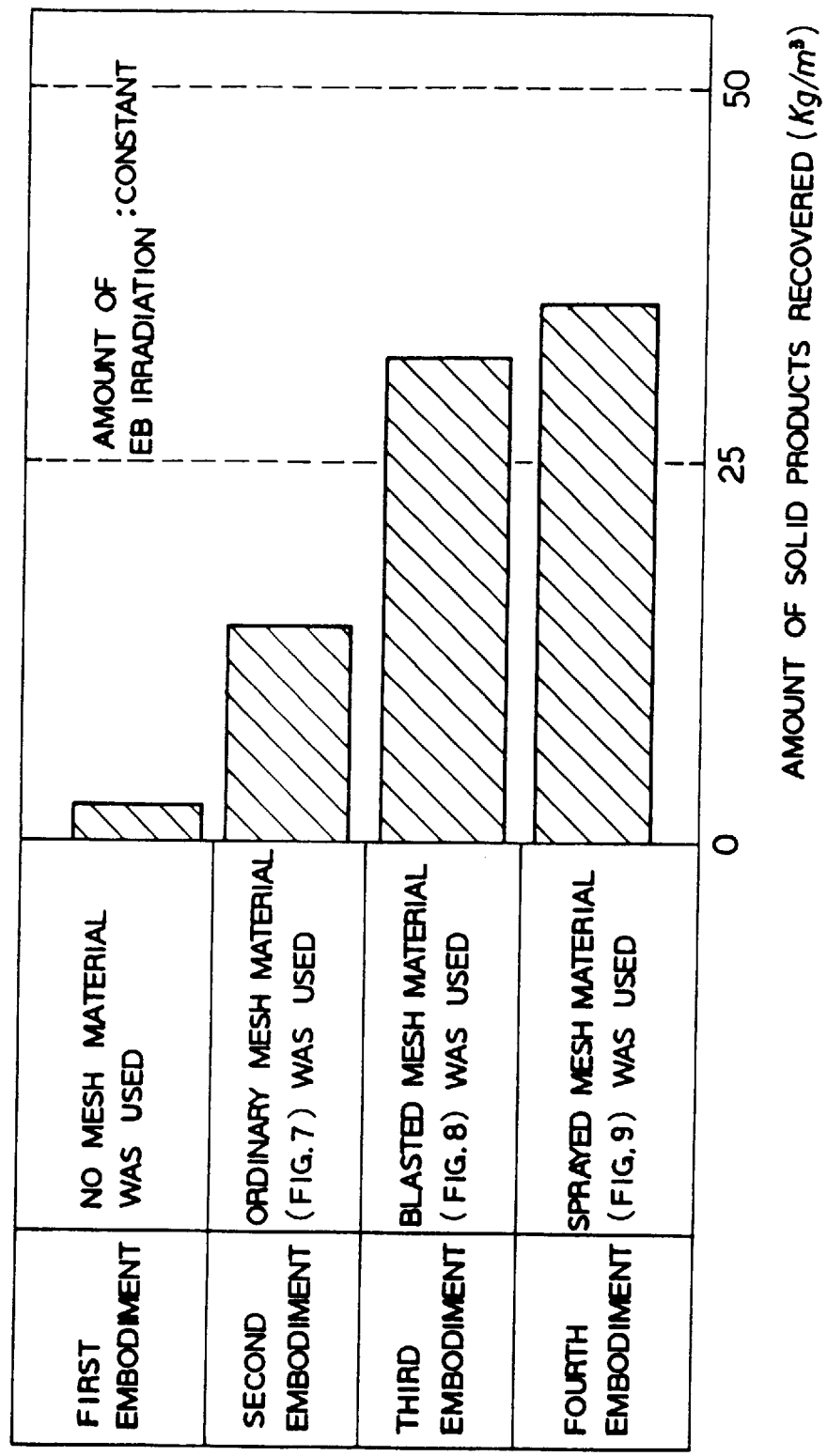
F I G. 11

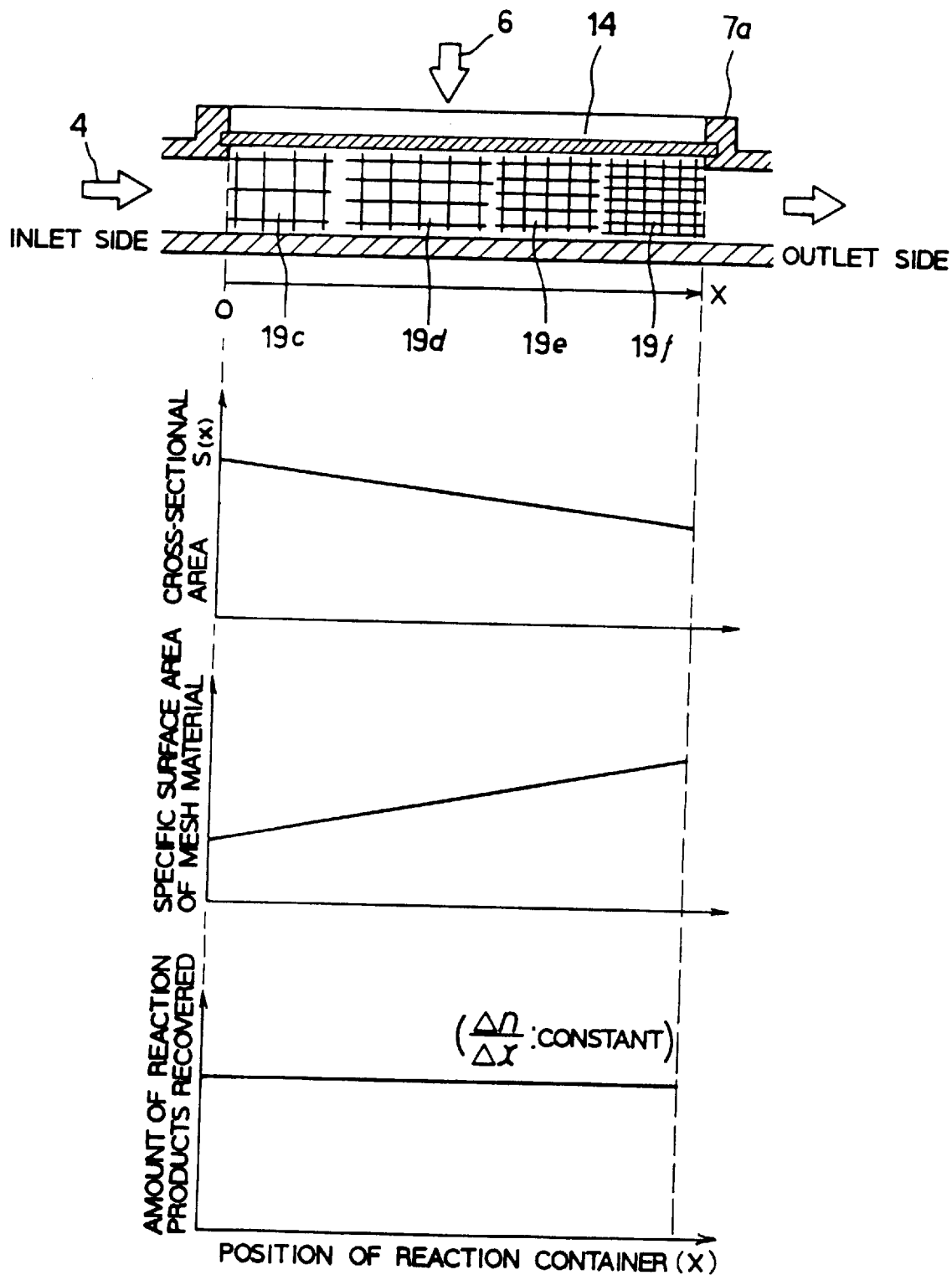
F I G. 18

APPARATUS AND METHOD FOR REMOVING CARBON DIOXIDE CONTAINED IN EXHAUST GAS

BACKGROUND OF THE INVENTION

1. Field of the Invention

The present invention relates to an apparatus and method for removing carbon dioxide contained in exhaust gas. More particularly, the present invention relates to an apparatus and method which are capable of economically removing carbon dioxide contained in exhaust gas, in which exhaust gas need not be specially heated or processed.

2. Description of the Related Art

In recent years, the amount of consumption of fossil fuel, such as petroleum or gas, has increased. Global warming in consequence with an increase in carbon dioxide ($CO_2$) generated as a result of combustion thereof is getting a great deal of attention as a major environmental problem. In particular, in this country, the amount of carbon dioxide discharged from thermal power plants has reached 25% of the total amount of $CO_2$ discharged in the whole country. Therefore, there is a great demand by society for the amount of $CO_2$ discharged from thermal power plants to be cut soon.

Various methods described below have hitherto been commonly used for removing $CO_2$ contained in exhaust gas:

(1) A method in which only the molecules of carbon dioxide are selectively adsorbed on the surfaces of amine and zeorite crystals having very fine pores on the surface thereof.

(2) A method in which catalytic hydrogenation reaction of carbon dioxide is promoted and carbon dioxide is decomposed on the surface of the catalyst.

(3) A method in which molecules of carbon dioxide are taken into a tunnel-type or car-type structure formed of an ensemble of a plurality of molecules and an inclusion compound (clathrate compound) is formed to remove the carbon dioxide.

(4) A method in which carbon dioxide is fixed by using an action such that living things, such as algae or coral, fix the carbonates ($CO_2$ or $HCO_3$) to transform carbon dioxide into organic matter or calcium carbonate, that is, a carbon dioxide assimilation action.

The various types of removal methods described above have been used depending upon the concentration and amount of discharged exhaust gas.

However, the pressure and temperature of the exhaust gas must be increased to increase the reaction speed in the method of removing $CO_2$ by the physical chemical reaction as in items (1) to (3) of the above-described removal methods. However, problems occur, for example, energy efficiency is lowered and production costs increase because the temperature of combustion exhaust gas discharged from thermal power plants, which is the main source from which $CO_2$ gas is discharged, is as low as 100° to 150° C. Therefore, the exhaust gas must be reheated to make the removal reaction efficiently proceed.

In the method of removing $CO_2$ by using the metabolism of living matter as described in item (4), there is an advantage in that processing is possible under the conditions of normal temperature and normal pressure. However, since the reaction speed is very low, a processing apparatus is required with a volume several times that of the power plant per se, in order to process the amount of gas (fifteen million $m^3/hr$) discharged from, for example, a power plant with a class of output of one million KW. Therefore, processing is very difficult on a practical level. There are hardly any by-products generated by the removal reaction which can be industrially reused no matter which of the above-mentioned processing methods is used. This method has troublesome processing problems, for example, some kind of secondary processing must be performed on every by-product, or the by-products must be securely stored for a long period of time.

SUMMARY OF THE INVENTION

The present invention has been achieved to solve the above-mentioned problems of the related art.

It is an object of the present invention to provide an apparatus and method for removing carbon dioxide contained in exhaust gas, in which carbon dioxide contained in exhaust gas can be removed at a high reaction speed under the conditions of temperature and pressure of the exhaust gas itself without needing to heat or pressurize a tremendous amount of exhaust gas discharged from thermal power plants. Reaction products are useful materials which can be used industrially. Such products need no disposal process or advanced processing and can be easily recovered as materials in the form of readily recoverable liquids or solids.

To achieve the above object, the inventors of the present invention conducted further research on a mechanism capable of efficiently removing $CO_2$ in an exhaust gas without having to apply a particularly large amount of energy. As a result, they found that although a tremendous amount of energy is required to directly decompose $CO_2$ in exhaust gas into CO or C by irradiating a high energy beam to the exhaust gas, the mixed gas is activated as a result of irradiating the high energy beam in a condition in which a gaseous hydrogen source which can easily generate atomic hydrogens is mixed with the exhaust gas, and $CO_2$ in the exhaust gas is reduced efficiently by hydrogen under such conditions as normal temperature and normal pressure.

It has been also confirmed that, as a result of a reaction container being filled with a filler, such as a mesh material braided with metallic wire, a porous member, a foaming member, a honeycomb, a fin, or the like, the reduction reaction of the activated hydrogen with carbon dioxide is promoted even more, making it possible to increase the amount of reaction products considerably and reduce the amount of energy required for reaction. In addition, it has been also found that, as a result of forming irregularities on the surface of the mesh material or filler, the specific surface area thereof is increased, thereby increasing the amount of reaction products recovered and shortening the reaction time. It has also been confirmed that as a result of setting the size of the aperture of the mesh material with which the reaction container is filled to be in a proper range, there is no risk that problems such as clogging will occur, and high reaction efficiency can be maintained for a long period of time. In addition, it has been found that, as a result of setting the size of the aperture of the mesh material and the cross-sectional area of the reaction container to become gradually smaller in size in the direction of the flow of the mixed gas, it is possible to increase reaction efficiency in the whole reaction container.

The present invention has been accomplished based on the above-described findings. An apparatus for removing carbon dioxide in exhaust gas in accordance with the present invention comprises: a hydrogen supply apparatus for supplying a hydrogen source; a mixer for uniformly mixing the hydrogen source supplied from the hydrogen supply apparatus with exhaust gas containing carbon dioxide in order to form mixed gas; a beam generator for generating high energy beams; a reaction container in which the high energy beams from the beam generator are irradiated to the mixed gas in order to activate the mixed gas, so that a reaction for reducing carbon dioxide is caused; and a recovery section for separating products generated by the reaction container from the exhaust gas and recovering them. It is preferable that a mesh material for promoting the reduction reaction between the activated hydrogen source and carbon dioxide in the exhaust gas be provided in multiple layers inside the reaction container. The size of the aperture of the mesh material is set at 0.3 mm or more. Preferably, the size of the aperture of the mesh material is set so as to decrease in size gradually along the flow of the mixed gas. In addition, the cross-sectional area of the reaction container is formed so as to decrease in size in the direction of the flow of the mixed gas.

The method for removing carbon dioxide in accordance with the present invention comprises the steps of forming a mixed gas by mixing a hydrogen source formed of hydrogen gas and/or a gaseous hydrogen compound with an exhaust gas containing carbon dioxide; activating the hydrogen source and carbon dioxide by irradiating a high energy beam to the mixed gas; reducing carbon dioxide contained in the exhaust gas by using activated hydrogen in order to transform the carbon dioxide into a solid or liquid compound; and recovering it.

Electron beams, laser beams, proton beams or the like are used as high energy beams. Preferably, electron beams whose acceleration voltages are 100 KV or above, or excimer laser beams whose wavelengths are 500 $\mu$m or lower are used to increase, in particular, the efficiency of reduction reaction of carbon dioxide. Not only hydrogen gas, but also a gaseous mixture of one or more kinds of material of a hydrogen compound, such as hydrocarbon (methane, ethane, ethylene, acetylene or the like), hydrogen sulfide, or water, which forms atomic hydrogen or an activator when it is irradiated with high energy beams, are used as the material which becomes a hydrogen source.

Since reaction products (by-products) differ depending upon, in particular, the kind of hydrogen source, a selection is made depending upon the applications thereof. The hydrogen source used in the apparatus and method of the present invention must satisfy the following three conditions: (i) the hydrogen source should easily generate atomic hydrogen which readily causes $CO_2$ reduction reactions, (ii) the hydrogen source should be a gas which has small toxicity and which is easy to handle, and (iii) the hydrogen source should be a solid or liquid whose by-products produced as a result of a reaction are industrially useful and which are easy to recover. Hydrogen, methane, ethane, ethylene, acetylene or water, having a large standard formation of enthalpy, is preferable as the material for satisfying the conditions (i) and (ii). As regards the condition (iii), the type of the hydrogen source differs depending upon what the by-products are set at.

A recovery section is preferably disposed in combination with a section for recovering solid and liquid products according to the properties of the product generated by the reduction reaction. It is preferable to use an electric dust collector as the recovery section to efficiently recover, in particular, fine products. Various polymers are recovered in the form of solid compounds, and methanol or ethanol is preferable as a liquid compound. When, in particular, produced products are used in an exhaust gas process as in a thermal power plant, it is preferable that recovered by-products be recovered in the form of methanol which can be newly reused as fuel.

According to the apparatus for removing carbon dioxide in exhaust gas constructed as described above, and method thereof, since high energy beams are irradiated onto a hydrogen source contained in the exhaustgas, hydrogen and carbon dioxide contained in the exhaust gas are activated under the conditions close to normal temperature and normal pressure, and carbon dioxide can be efficiently reduced by the activated hydrogen.

The by-products produced by the method of the present invention are useful by-products, such as methanol, which can be reused industrially and which are easy to recover. In addition, the by-products need not be processed or stored. Thus, this is a very useful removal method.

By properly adjusting the size of the cross-sectional area and shape of the reaction container of the carbon-dioxide removal apparatus, a decrease in pressure caused by the reaction of mixed gas can be suppressed, an attenuation in the intensity of high energy beam irradiated onto mixed gas can be suppressed, and reaction products can be efficiently recovered. Also, by properly adjusting the size of the aperture of the mesh material with which the reaction container is filled, the amount of reaction products recovered can be kept constant regardless of the position of the reaction container. With the arrangement described above, incidence of collision of gases can be increased, interaction between reaction components and high energy beams can be promoted, and reaction efficiency can be increased considerably.

BRIEF DESCRIPTION OF THE DRAWINGS

In the accompanying drawings:

FIG. 1 is a system diagram illustrating a first embodiment of an apparatus for removing carbon dioxide contained in exhaust gas in accordance with the present invention;

FIG. 10 is a graph showing the relationship between the specific surface area of the mesh material and the amount of solid products recovered;

FIG. 11 is a graph showing the relationship between the properties of the mesh material and the amount of solid products recovered;

FIG. 18 is an illustration of an arrangement of the mesh material, the varying rate of the cross-sectional area of the reaction container, and the specific surface area of the mesh material, in an apparatus for removing carbon dioxide in exhaust gas in accordance with a sixth embodiment of the present invention.

DESCRIPTION OF THE PREFERRED EMBODIMENTS

Figure 2:
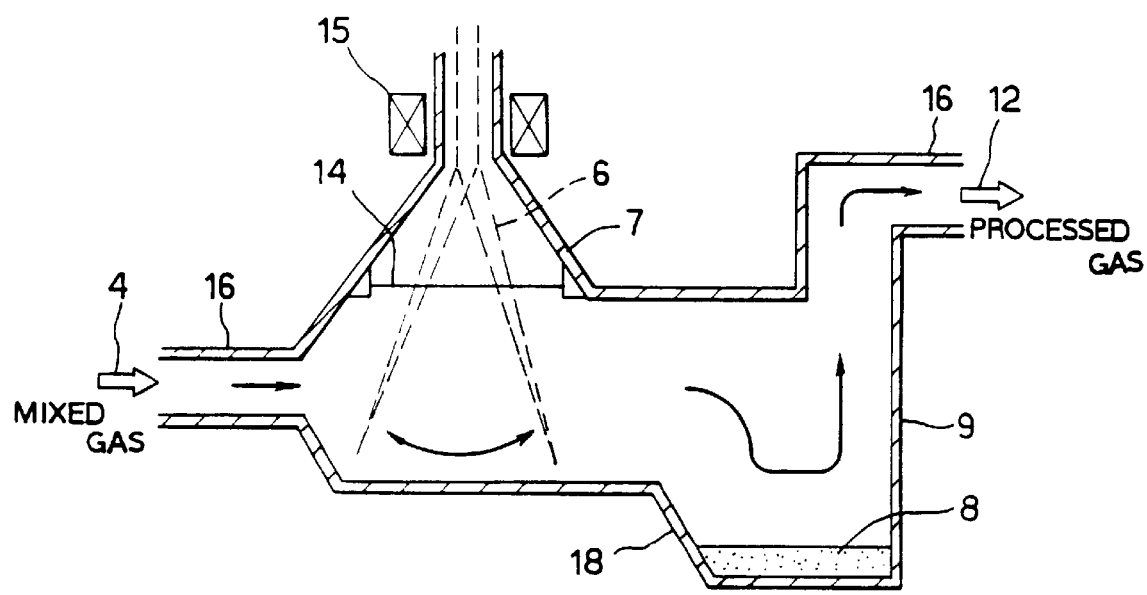
FIG. 2 is a sectional view illustrating the reaction container and the solid recovery section shown in FIG. 1.

Next, embodiments of the present invention will be explained in more detail with reference to the accompanying drawings.

First Embodiment

FIG. 1 is a system diagram illustrating a first embodiment of an apparatus for removing carbon dioxide ($CO_2$) in exhaust gas in accordance with the present invention, comprising a mixer 3 for mixing an exhaust gas 1 with a hydrogen source from a hydrogen supply apparatus 2 so as to prepare a mixed gas 4; a reaction container 7 for causing reduction reaction of $Co_2$ by irradiating an electron beam 6 from an electron beam generator 5 onto the mixed gas 4; a solid recovery section 9 for separating a solid product 8 generated by the reduction reaction of $CO_2$ from the exhaust gas 1 and recovering it; a liquid recovery section 11 for separating a liquid product 10 generated by the reduction reaction of $CO_2$ from the exhaust gas 1 and recovering it; and a stack 13 for discharging processed gas 12 from which $CO_2$ has been removed and reduced by the reduction reaction of $CO_2$ to the atmospheric air, the above components being connected serially.

Figure 3:
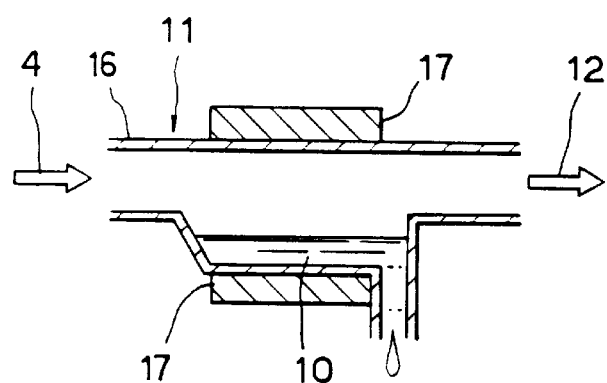
FIG. 3 is a sectional view illustrating the construction of the liquid recovery section shown in FIG. 1.

As shown in FIG. 2, the reaction container 7 and the solid recovery section 9 are so constructed that the electron beam 6 is irradiated through an electron transmission window 14 into the space within the reaction container. The irradiated electron beam 6 is oscillated, by means of a beam deflector 15, in a width range of approximately 1 m within the reaction container 7. The solid recovery section 9 is formed so as to change the direction of the flow of the exhaust gas 1 from the reaction container 7, a puddle 18 of the solid product 8 being formed on the bottom of the reaction container 7. The liquid recovery section 11, on the other hand, is constructed so as to have a cooler 17 disposed on the outer periphery of a pipe line 16 for introducing the mixed gas 4, as shown in FIG. 3.

The exhaust gas 1 discharged from a thermal power plant or the like is mixed by the mixer 3 with acetylene ($C_2H_2$) or ethylene ($C_2H_4$) as the hydrogen source supplied from the hydrogen supply apparatus 2, the resulting mixed gas 4 then being sent to the reaction container 7, where the electron beam 6 from the electron beam generator 5 is irradiated onto the mixed gas 4 through the electron transmission window 14 disposed in the upper section of the reaction container 7. Carbon dioxide and hydrogen sources such as $C_2H_2$ and $C_2H4_4$ contained in the irradiated mixed gas 4 are activated, and a part of the hydrogen source is decomposed into atomic hydrogen, which promotes the reduction reaction of the carbon dioxide. Since the reduction reaction of the carbon dioxide and hydrogen in the mixed gas 4 is completed in several seconds, the volume of the reaction container 7 is so set that the reaction time becomes equal to the retention time of the mixed gas 4 in the reaction container 7. The flow rate of the mixed gas 4 is set at approximately 1 to 3 m/sec, and the electron beam 6 is oscillated properly by the beam deflector 15 so that the beam is irradiated over the entire inner area of the reaction container 7.

Since the acetylene ($C_2H_2$) injected into the exhaust gas 1 as a hydrogen source has a large standard free formation of enthalpy and the carbon atoms are bound together by a triple structure binding, the acetylene is readily activated to discharge atomic hydrogen.

The discharged atomic hydrogen reacts with $CO_2$ to reduce the $CO_2$ as shown in formula (1) described below. Molecules separated from the carbon atom's triple structure binding readily accepts $CO_2$, and as shown in formula (2), one kind of polymer, such as polymer acrylate, is formed as a solid product.

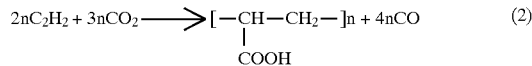

Also, since ethylene ($C_2H_4$) has a large standard free energy of formation and adjacent carbon atoms are bonded by a double bond, ethylene is readily activated to easily discharge atomic hydrogen. As a result, the ethylene reduces carbon dioxide and the double bond of carbon is dissociated in a manner similar to that in the case of acetylene, thus forming methyl alcohol and ethyl alcohol, as shown in formulas (3) and (4).

The solid product 8 in the form of powder, from among by-products in solid and liquid forms formed by the reduction reaction of carbon dioxide by the hydrogen (hydrogen source) activated in the above way, is moved toward the downstream side in a condition in which the solid product 8 is caught in the exhaust gas 1. Then, as shown in FIG. 2, the solid product 8 collides with the side wall of the solid recovery section 9 constructed so as to lower the flow rate of gas and to change the direction of flow of the gas, to be precipitated, separated and then recovered.

On the other hand, the liquid product 10 which is formed by the reduction reaction of $CO_2$ and contained in a vapor condition in the mixed gas is condensed as a result of being cooled by the cooler 17 to be separated and then recovered as liquid droplets in the liquid recovery section 11, as shown in FIG. 3. The processed gas 12 from which the reaction product 8 in solid form and the reaction product 10 in liquid form have been removed is then discharged to the atmospheric air through the stack 13.

Figure 4:
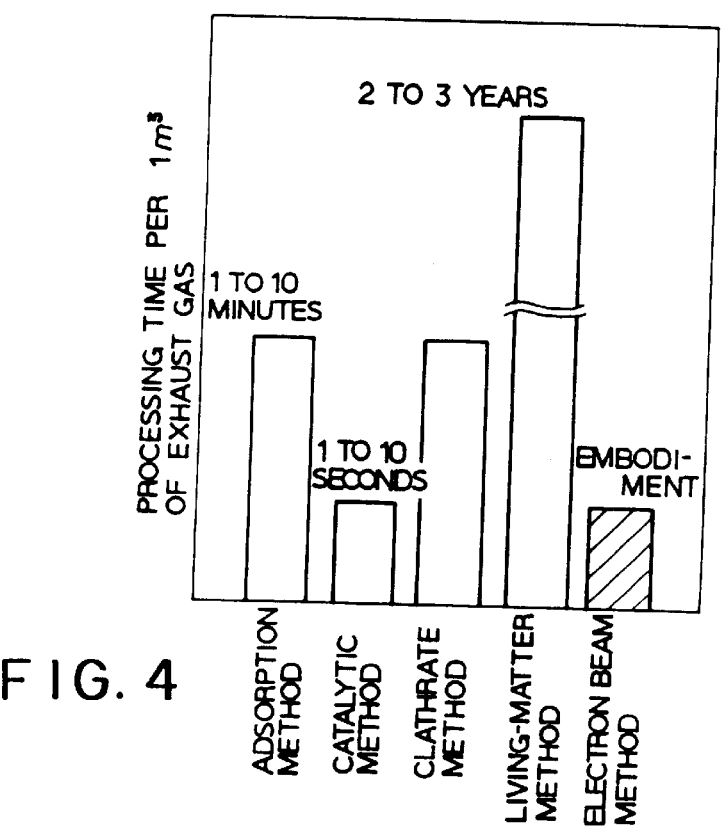
FIG. 4 is a graph showing a comparison of times required to process exhaust gas in various processing methods.

According to the method of removing carbon dioxide contained in exhaust gas in accordance with this embodiment, as described above, $C_2H_2$ and $C_2H_4$ as hydrogen sources are activated by electron beam irradiation, thereby generating atomic hydrogen and making it possible to reduce carbon dioxide in a very short reaction time. As shown in FIG. 4, a comparison of times required to process each 1 $m^3$ of exhaust gas for various types of processing methods indicates that exhaust gas can be processed most efficiently by the removal method using electron beams in accordance with this embodiment because the time required to reduce the exhaust gas is as short as several seconds.

Figure 5:
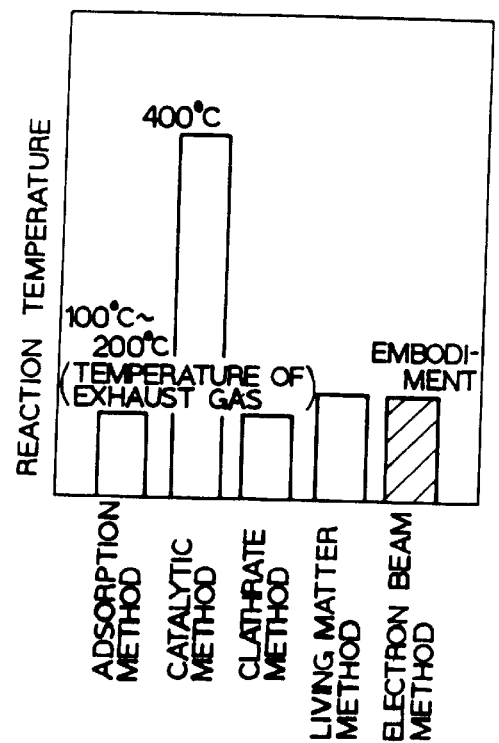
FIG. 5 is a graph showing a comparison of temperatures required to exhaust gas in various processing methods.

As shown in FIG. 5, a comparison of temperatures required for reduction reaction of Co, in various processing methods indicates that in the method in accordance with this embodiment, it is possible to process exhaust gas as it is in a range of normal temperatures of 100° to 2000° C. and that there is no need to heat anew. Thus, this method has excellent energy efficiency.

In addition, this method has an advantage in that a proper selection of a hydrogen source makes it possible to obtain a reaction product (by-product) which is industrially useful and easy to recover and separate. By-products produced by various types of processing methods are shown in Table 1 below.

TABLE 1

|  | Comparative Examples | | | | Embodiments |
| --- | --- | --- | --- | --- | --- |
|  | Adsorption Method | Catalytic Method | Clathrate Method | Living-matter Method | Electron Beam Method |
| By-product | (Carbonate) | Alcohol | Clathrate Compound | $CaCO_3$ | Alcohol or others |

As is clear from Table 1, in the adsorption method, an adsorption medium is reproduced and finally fixed as carbonate. Industrial applications of by-products by the clathrate method and the living-matter method are small. Although in the catalytic method industrially useful alcohol is generated, it is necessary to increase the reaction temperature as described above, and energy efficiency is low. In contrast, according to the electron beam method of this embodiment, alcohol or the like which can be reused under processing conditions at close to normal temperature is formed as a by-product. This is highly advantageous.

The gas used as the hydrogen source is not limited to organic compounds, such as acetylene ($C_2H_2$) or ethylene ($C_2H_4$), but the inorganic gases of hydrogen sulfide, water, hydrogen or the like may also be used. When hydrogen sulfide, water, or hydrogen is mixed with exhaust gas and an electron beam is irradiated, atomic hydrogen (H) is discharged as shown in formulas (5), (6) and (7) described below, respectively. It has been confirmed that this atomic hydrogen (H) reduces carbon dioxide, and methane ($CH_4$) is formed.

$$H_2S \rightarrow 2H + S \quad (5)$$

$$H_2O \rightarrow H + OH \quad (6)$$

$$H_2 \rightarrow 2H \quad (7)$$

$$CO_2 + 4H \rightarrow CH_4 + H_2O \quad (8)$$

Although in this embodiment electron beams are used as high energy beams as an example, the present invention is not limited to this electron beam, but the same effect can be obtained when laser beams or protron beams are irradiated. Since the reaction selectivity of the laser beam is high because it is a single wavelength light, it is easy to control the reduction reaction, and only desired reaction products (by-products) are formed. Since the protron beam itself is formed of hydrogen ions, there is no need to separately dispose a hydrogen supply apparatus, making it possible to simplify the construction of the removal apparatus.

Since the mechanism for promoting the reaction between gases is not disposed in the carbon-dioxide removal apparatus shown in FIG. 2, the reaction efficiency is still low. When exhaust gas is processed, in particular, gas discharged from a thermal power plant, whose ratio of mixture of $CO_2$ is as high as 10 to 20%, the amount of energy required for the reduction reaction of $CO_2$ becomes large, and the ratio of $CO_2$ gas remaining in the processed gas is undesirably higher.

In this connection, the inventors of the present invention have continued their research to increase the amount of reaction production between the hydrogen source and $CO_2$, reduce energy required for the reaction, and improve the overall reaction efficiency.

As a result, they found that the provision of a filler, such as a metallic mesh, a porous member or a foaming member having a large specific surface area in the high energy beam irradiation area within the reaction container, promotes the collision of the hydrogen source with $CO_2$ gas on the surface of the mesh material or the filler, the reduction reaction between them, and the interaction between the air and the high energy beam, thus considerably increasing the amount of reaction products.

It has been confirmed that when mixed gas of exhaust gas and a hydrogen source is introduced into the reaction container and a high energy beam is irradiated onto the mixed gas to promote the reduction reaction, the collision and reaction between gases, and interaction between the gas and the high energy beam are promoted more on the wall surface inside the reaction container than in the inner area of the reaction container, and that the larger the specific surface area of the wall surface inside the reaction container, the larger the amount of reaction products. In this connection, instead of increasing the area of the wall surface inside the reaction container, mesh materials having a large specific surface area are disposed in multiple layers inside the reaction container. As a result, it has been confirmed that this arrangement improves the reaction efficiency.

An explanation will be given of the second to fourth embodiments of a carbon-dioxide removal apparatus having the mesh material disposed inside the reaction container.

Second to Fourth Embodiments

Figure 6:
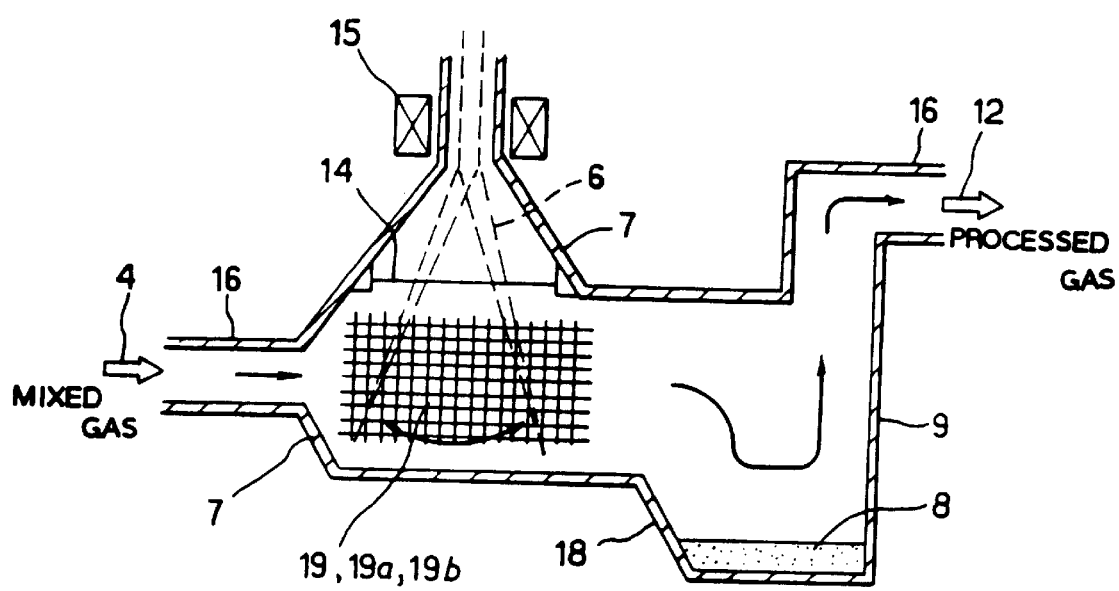
FIG. 6 is a system diagram illustrating an apparatus for removing carbon dioxide contained in exhaust gas in accordance with a second embodiment of the present invention.

FIG. 6 is a system diagram illustrating an apparatus for removing carbon dioxide contained in exhaust gas in accordance with the second to fourth embodiments of the present invention. This apparatus is constructed the same as that shown in FIG. 2 except that metallic mesh materials 19, 19a and 19b having different specifications are disposed in multiple layers inside the reaction container of the apparatus of the first embodiment shown in FIG. 2.

The materials described below are used as the mesh materials 19, 19a and 19b: a mesh material (second embodiment) 19 in which a corrosion-resistant metallic wire 20 formed from stainless steel or the like, for example, having a diameter of approximately 0.5 to 1 mm, is braided in a crisscross manner; a mesh material 19a (third embodiment) in which the mesh material 19 is blasted, a recessed portion 21 is formed on the surface of the metallic wire 20 so as to form irregularities overall on the surface of the metallic wire 20; and a mesh material 19a (fourth embodiment) in which the mesh material 19 is metal-sprayed, and a projection 22 is formed on the surface of the metallic wire 20 so that irregularities are formed overall on the surface of the metallic wire 20.

The size of the aperture of the mesh material is a factor which greatly affects reaction efficiency. It has been confirmed that because the smaller the size of this aperture, the greater the specific surface area of the mesh material, reaction efficiency can be improved even more. However, if the size of the aperture of the mesh material is not greater than 0.3 mm, the solid products formed by the reduction reaction are likely to bridge the surface of the mesh material, and thus the mesh material is likely to be clogged. Therefore, the size of the aperture of the mesh material is preferably set no smaller than 0.3 mm, and more preferably, no smaller than 0.5 mm.

The mesh material is disposed in multiple layers in the form of tens of layers or hundreds of layers in the high energy beam irradiation area within the reaction container. The metallic wire which forms each mesh material can be blasted and sprayed to increase the specific surface area of the mesh material.

The exhaust gas 1 discharged from a thermal power plant or the like is uniformly mixed by the mixer 3, with a hydrogen source from the hydrogen supply apparatus 2, and is formed into the mixed gas 4. Next, as shown in FIG. 6, the mixed gas 4 passes through the introduction pipe line 16 and is introduced into the reaction container 7. As the metallic mesh materials 19, 19a and 19b are disposed in the passage of the mixed gas 4 within the reaction container 7, the mixed gas 4 flows through the metallic mesh materials 19, 19a and 19b. Then, the electron beam 6 is irradiated through the electron transmission window 14 disposed on the reaction container 7. Thereupon, the electron beam 6 is oscillated by the beam deflector(oscillation coil) 15 in order to secure a wide irradiation area. Since the mesh material is disposed in the exhaust gas passage, the collision of $CO_2$ in the exhaust gas with the hydrogen source is likely to occur. The reduction reaction of $CO_2$, is promoted by the $CO_2$ activated by the electron beam 6 and the hydrogen source, and the interaction between the electron beam 6 and the gas proceeds smoothly with the mesh material as a catalyst. The solid product 8 and the liquid product are formed by the reduction reaction between the activated $CO_2$ and the hydrogen source. Generally, the formed solid product 8 is not a hard substance, but a powder, and thus the binding force thereof with the mesh material is weak. Therefore, the powder formed on the surface of the mesh material by the reduction reaction is likely to be separated therefrom by a small flow of the exhaust gas and transported to the downstream side. However, when, as described above the size of the aperture of the mesh material is not greater than 0.3 mm, clogging is likely to occur. Therefore, the size of the aperture is set no smaller than 0.3 mm. The solid product 8 separated from the mesh material is recovered by the solid recovery section 9 disposed on the secondary side of the reaction container 7. Therefore, the solid recovery section 9 has a passage area larger than that of the reaction container 7, which passage decreases the flow rate of the processed gas. The solid product 8 contained in the processed gas is sedimented in the puddle 18 and recovered.

In the apparatus for removing carbon dioxide contained in exhaust gas in accordance with the second to fourth embodiments, the metallic mesh material uses the action, as one kind of catalyst, for promoting the collision and reaction of gases contained in the exhaust gas and for performing interaction between the gas and the electron beam. That is, in ordinary chemical plants or the like, the collision and reaction of gases proceeds in the space inside the reaction container under high temperature and high pressure. But, in room temperature and such normal temperature of approximately 100° C. , and normal pressure as in the apparatus of this embodiment, the collision and reaction of gases occurs even more on the wall surface of the reaction container than in the inner space of the reaction container. It has been found that a mechanism for promoting the collision of gases and a carrier which serves as the nucleus of the reaction are indispensable in the reaction system in which a solid product is formed by the reaction of gases as, in particular, in the apparatus of this embodiment. It has been found that particularly the mechanism and the carrier are even more important in the reaction system in which the interaction between the electron beam and gas is an important factor.

In this connection, the metallic mesh materials 19, 19a and 19b, which are the nucleus of the collision promotion mechanism and of the reaction, are filled in the beam irradiation area within the reaction container. As a result, the reaction between $CO_2$ and the hydrogen source is promoted, the amount of reaction products recovered increases considerably, and the amount of energy required for the reaction also decreases considerably.

In the apparatus for removing carbon dioxide in exhaust gas in accordance with the second embodiment, the apertures of the metallic mesh materials 19, 19a and 19b, i.e., the interval of the metallic wire 20, are varied, or the size of the diameter of the metallic wire 20 is varied, so that the specific surface area of the metallic mesh material 19 is varied. Influences of the variations upon the amount of reaction products have been confirmed by experiments.

FIG. 10 is a graph showing the relationship between the specific surface area of the mesh materials and the amount of solid products recovered in a condition in which the amount of electron beam (EB) irradiation is kept constant and exhaust gas containing $CO_2$ gas is processed under room temperature and atmospheric pressure.

As is clear from the results shown in FIG. 10, it has been confirmed that the amount of solid products recovered increases proportionally to the specific surface area of the mesh materials. More specifically, it has been found that the amount of solid products recovered, when a mesh fabric having a metallic wire diameter of 0.5 mm, wire intervals of 1.0 mm, and an aperture of 0.5 mm are stacked in 100 layers within the reaction container (with a specific surface area: 5 $m^2/m^3$), is six times as great as that when no mesh material is disposed (with a specific surface area: 0 $m^2/m^3$). This means that the provision of the mesh material reduces the amount of energy consumption to one sixth.

Figure 7:
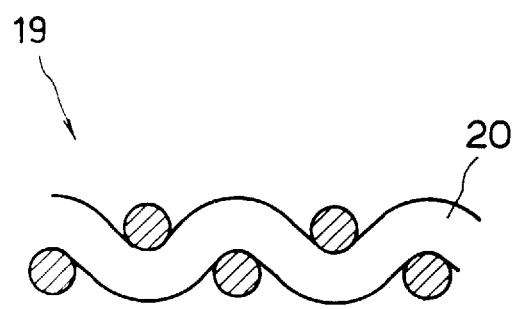
FIG. 7 is a sectional view illustrating the construction of a mesh material used in an apparatus for removing carbon dioxide in exhaust gas in accordance with the second embodiment of the present invention.
Figure 8:
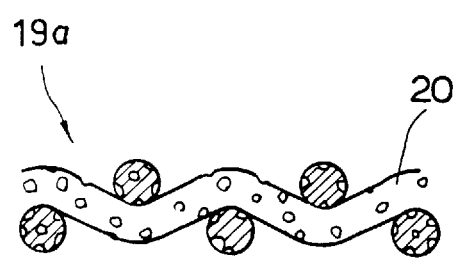
FIG. 8 is a sectional view illustrating the construction of a mesh material used in an apparatus for removing carbon dioxide in exhaust gas in accordance with a third embodiment of the present invention.
Figure 9:
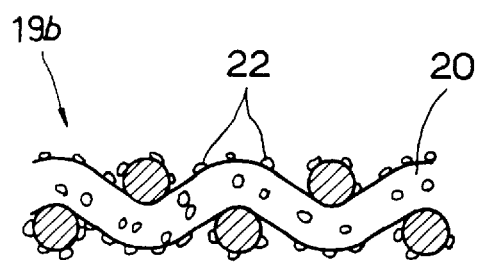
FIG. 9 is a sectional view illustrating the construction of a mesh material used in an apparatus for removing carbon dioxide in exhaust gas in accordance with a fourth embodiment of the present invention.

Next, exhaust gas processing was performed in a condition in which the amount of electron beam irradiation is maintained constant by using the apparatus for removing carbon dioxide contained in exhaust gas in accordance with the first embodiment in which no mesh material is used, and by using apparatuses of the second to fourth embodiments in which the ordinary mesh material 19 shown in FIG. 7, the blasted mesh material 19a shown in FIG. 8, and the metal-sprayed mesh material 19b shown in FIG. 9 are disposed respectively in 100 layers within the reaction container 7. The influence of the specific surface area of each mesh material upon the amount of solid products recovered were measured, and the results shown in FIG. 11 were obtained.

As is clear from the results shown in FIG. 11, the amount of solid products recovered by the apparatus for removing carbon dioxide contained in exhaust gas in accordance with the third to fourth embodiments, in which the blasted mesh material 19a and the metal-sprayed mesh material 19b are used respectively, is twice that of the apparatus of the second embodiment in which the non-processed mesh material 19 is used. It has been confirmed that the amount of solid products recovered by the apparatus in accordance with the third to fourth embodiments is approximately ten times as great as that of the first embodiment in which no mesh material is used; thus the reaction efficiency is increased considerably.

Next, the time of electron beam irradiation is varied in the apparatus for removing carbon dioxide contain ed in exhaust gas in accordance with the first to fourth embodiments. Influences of the irradiation time (corresponding to the amount of irradiation) upon the amount of solid products recovered were investigated. The results shown in FIG. 12 were obtained.

Figure 12:
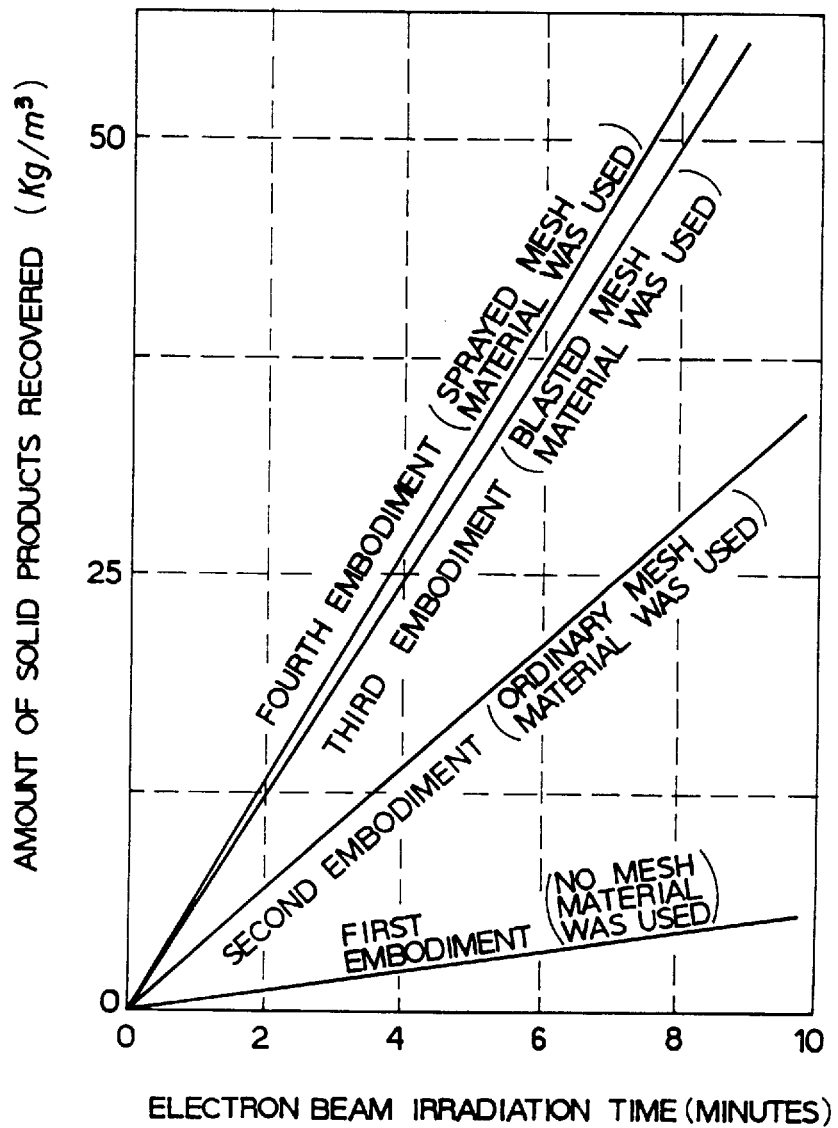
FIG. 12 is a graph showing the relationship between the time of electron beam irradiation and the amount of solid products recovered.

As is clear from the results shown in FIG. 12, it has been confirmed that there is a tendency for the amount of solid products recovered to increase proportionally to the amount of irradiation of electron beams, and the reaction time is shortened. It has been demonstrated that this tendency is more conspicuous when a mesh material having a large specific surface area is disposed within the reaction container.

As described above, in the carbon-dioxide removal apparatus in accordance with the first to fourth embodiments, since a filler such as a mesh material is disposed in the high energy beam irradiation area for activating $CO_2$ and the hydrogen source, it is possible to increase the amount of reaction products and decrease the total amount of energy required for the reaction, thus improving the reaction efficiency considerably.

Further, the inventors of the present invention have continued their study on factors which greatly affect the reaction between the hydrogen source and $CO_2$ in order to improve the efficiency of removing $CO_2$ contained in the exhaust gas and increase the amount of reaction products even more. As a result, it has been found that the reaction between exhaust gas and the hydrogen source by irradiation of a high energy beam is governed by the following three factors:

(1) the incidence of collisions of $CO_2$ contained in the exhaust gas with the hydrogen source gas
(2) the intensity of the high energy beam
(3) the enlargement of the reaction production nucleus.

The number of collisions of $CO_2$ contained in the exhaust gas with the hydrogen source gas is proportional to the mean free path L of gas molecules. This mean free path L is expressed by equation (9) below:

$$L = kT/(\sqrt{2\pi d^2 P}) \qquad (9)$$

where K is a Boltzmann's constant, T is the temperature, d is the diameter of molecules, and p is the pressure. It can be estimated from equation (9) that the incidence of collisions is proportional to pressure and inversely proportional to temperature. However, since temperature was expected to contribute to the improvement of the reactivity of gases, the inventors of the present invention conducted further research on the influence of pressure and temperature upon the amount of reaction products from the exhaust gas and the hydrogen source, caused by the irradiation of high energy beams.

As a result, it has become clear that the amount of reaction products increases proportionally to pressure in a range from 0 to 15 kPa. In contrast, a tendency has been confirmed that there is not much change in the amount of reaction products within a temperature range from room temperature (RT) to 150° C., and the amount of reaction products decreases slightly in temperatures exceeding 150° C.

When the influence of the intensity of the high energy beam in item (2) upon the amount of reaction products was confirmed by experiments, it became clear that the amount of reaction products increases proportionally to the intensity of beams in a range of 0 to 2 MGy.

In addition, since the energy of electron beams is consumed by the excitation of the hydrogen source and the reaction exhaust gas, and attenuates, the energy of electron beams decreases the farther the beams are moved away from the electron transmission window, that is, with an increase in the distance of the electron transmission. It has been confirmed that the amount of reaction products also decreases at the same time, becoming zero at the electron transmission distance at which the energy of electron beams become approximately zero. Therefore, the volume efficiency of the reaction container can be maximized by setting the thickness of the reaction container to be in the effective range of the high energy beams when the carbon-dioxide removal apparatus is constructed.

Lastly, the enlargement of the reduction reaction nucleus of item (3) has been explained with reference to the above-described second to fourth embodiments. More specifically, it has been found that the amount of reaction products increases as a result of disposing a mesh material having a large specific surface area in the high energy beam irradiation area within the reaction container. This indicates that the wall surface of the reaction container and the surface of the mesh material contribute serving as the reduction reaction nucleus in the reaction system of gases. Ordinarily, it is possible to increase the amount of reaction products by decreasing the size of the aperture of the mesh material so as to increase the specific surface area thereof. However, it also has become clear from the result of subsequent research by the inventors of the present invention that an excessive increase in the specific surface area conversely decrease s the amount of reaction products. It has become clear that the reason for this is that the mesh material which acts as a reaction site attenuates electrons conversely, thereby impeding the interaction between the high energy beam and each gas.

Based on the above-described findings, when an apparatus for efficiently removing $CO_2$ is designed, it is preferable to suppress a decrease i n the pressure of the mixed gas of exhaust gas and a hydrogen source and t o maintain a constant attenuation of the intensity of the high energy beam irradiated onto the mixed gas by varying the cross-sectional area and shape of the reaction container. In addition, it is possible to suppress the attenuation of the intensity of the beam and to promote the reduction reaction by the hydrogen source of the exhaust gas by varying the shape of the mesh material disposed within the reaction container. Accordingly, by varying the shape of the mesh material, the incidence of collision of gases can be increased, and the interaction between the gas and the high energy beam can be promoted, thus improving the reaction efficiency.

A concrete example of an improved carbon-dioxide ($CO_2$) removal apparatus based on the above-described findings will be explained below as a fifth embodiment.

Fifth Embodiment

Figure 13:
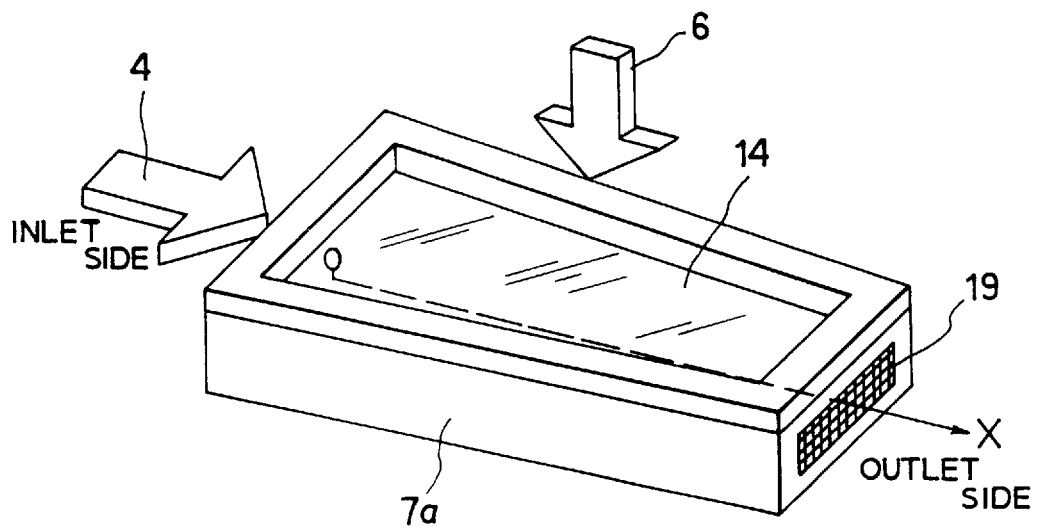
FIG. 13 is a perspective view illustrating the shape of a reaction container of an apparatus for removing carbon dioxide in accordance with a fifth embodiment of the present invention.

FIG. 13 is a perspective view illustrating the shape of a reaction container 7a used in the apparatus for removing carbon dioxide in accordance with the fifth embodiment of the present invention. The process for removing $CO_2$ of the fifth embodiment is the same as that of the system diagram shown in FIG. 1, and the components of the apparatus other than the reaction container 7a are the same as those of the $CO_2$ removal apparatus in accordance with the first to fourth embodiments.

The cross-sectional area S of the reaction container 7a is varied in the direction of the flow of a mixed gas so as to decrease the pressure loss of the exhaust gas. More specifically, the pressure loss caused within the reaction container is caused as a result of $CO_2$ within the exhaust gas and the hydrogen source reacting and being formed into a solid. Therefore, it is necessary to decrease the cross-sectional area of the reaction container in proportion to the decrease in the gas components in order to maintain constant the pressure in the whole reaction container. At this point, if $\Delta n/\Delta x = a$ is set assuming that the amount (n moles) of the decrease of the mixed gas 4 of the exhaust gas and the hydrogen source indicates a constant value "a" irrespective of the position (X) of the reaction container, the cross-sectional area S(x) for making the pressure p constant at the position X of the reaction container 7a can be given by the following equation (10):

$$S(x) = S_0 - R\,T/p \cdot a \cdot x \qquad (10)$$

where $S_0$ is the cross-sectional area of the inlet of the reaction container 7a, R is the gas constant, T is temperature, and n is the molar number. Therefore, it is necessary to temporarily decrease S(x) of the reaction container 7a in the direction of the flow of the mixed gas 4 as shown in FIG. 13 in order to make the reaction of gases proceed in a condition in which the pressure inside the reaction container is maintained at a constant value.

Figure 14:
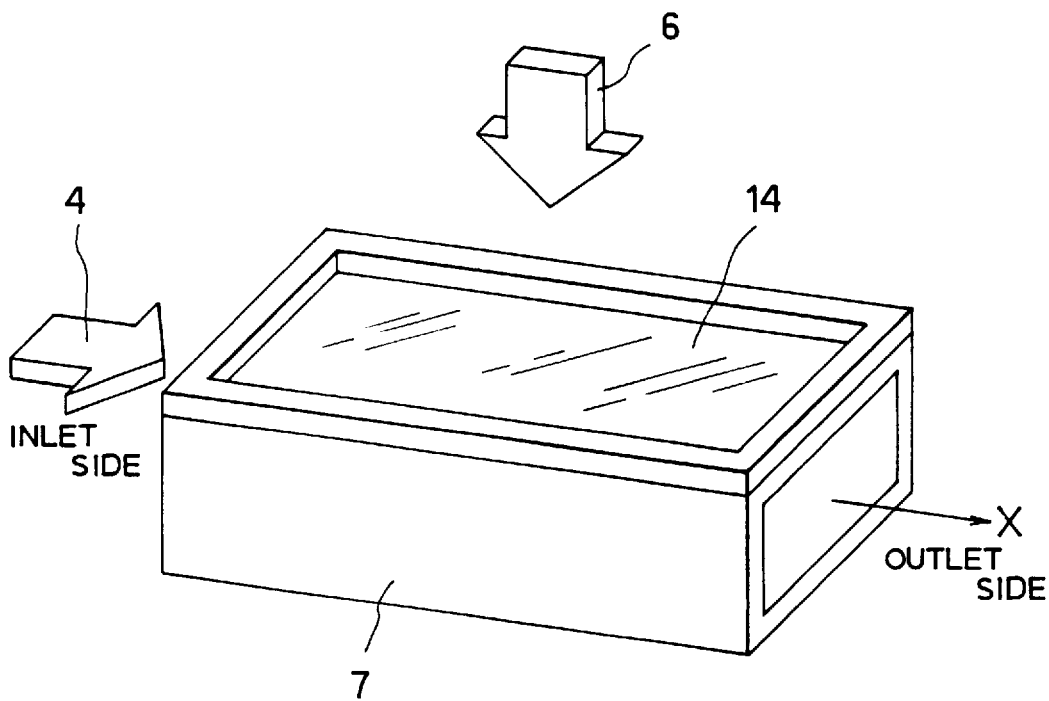
FIG. 14 is a perspective view illustrating the shape of the reaction container of the apparatus for removing carbon dioxide in accordance with the first to fourth embodiments of the present invention.

The operation for removing $CO_2$ contained in the exhaust gas is performed by using the reaction container 7a in the shape shown in FIG. 13, and the amount of reaction products at each position X in the direction of the gas flow of the reaction container 7a was measured. On the other hand, the amount of reaction products was measured in the same manner as above at each position of the reaction container 7 whose cross-sectional area $S_0$ is constant in the direction of the gas flow as shown in FIG. 14, such reaction container 7 being used in the $CO_2$ removal apparatus in accordance with the first to fourth embodiments. The results shown in FIG. 15 were obtained.

Figure 15:
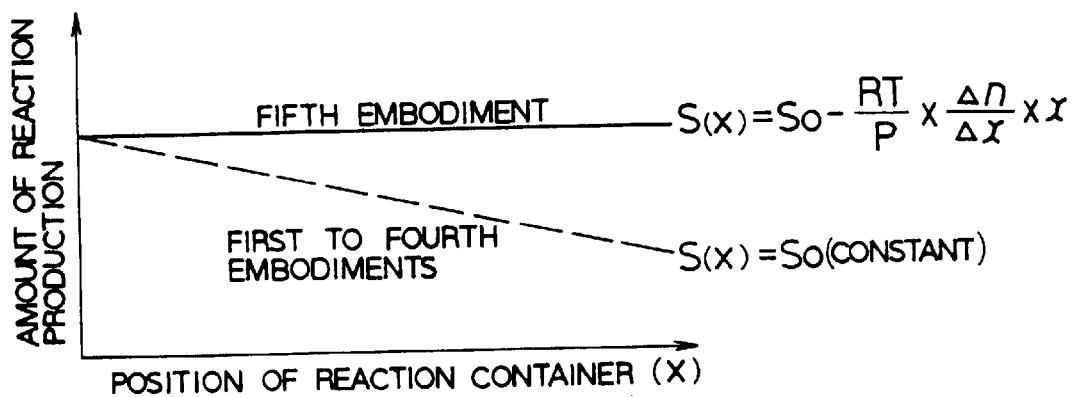
FIG. 15 is a graph showing the amount of reaction production at various positions of the reaction container.

As is clear from the results shown in FIG. 15, when the reaction container 7a is used in which the cross-sectional area thereof is gradually decreased to compensate for the pressure loss caused by a decrease in the reaction components of the mixed gas, the amount of reaction products was constant irrespective of the position of the reaction container 7a. When, in contrast, the reaction container 7 of the first to fourth embodiments, in which the cross-sectional area thereof is constant, is used, it has been confirmed that the amount of reaction products decreases in the direction of the flow of the mixed gas. This means that pressure changes at each position are eliminated in the reaction container 7a of the fifth embodiment, and the incidence of collision of gases is constant irrespective of the position of the reaction container 7a. Therefore, a decrease in the amount of reaction products in the reaction container overall can be suppressed.

Figure 16:
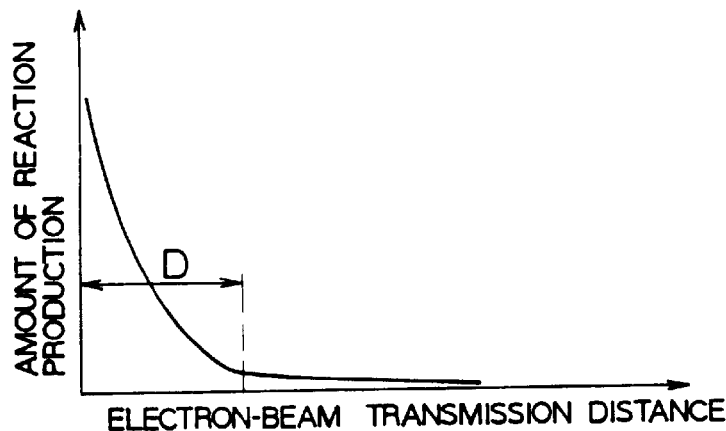
FIG. 16 is a graph showing the relationship between the distance of electron beam transmission and the amount of reaction production.

Consideration must be given also to the distance of electron beam transmission to improve the volume efficiency of the reaction container 7a. That is, a high energy beam, such as the electron beam 6, is irradiated onto the inside of the reaction container 7a through the electron transmission window 14 disposed in the top side of the reaction container 7a. When the relationship between the distance of the electron beam transmission and the amount of reaction products was examined, results shown in FIG. 16 were obtained. As is clear from the results shown in FIG. 16, since the irradiated electron beam 6 is consumed by the excitation of the hydrogen source and the reaction between gases, the intensity of the beams attenuates. That is, the amount of reaction products decreases proportionally the farther the beam is away from the electron transmission window 14 of the reaction container 7a and the smaller the intensity of energy becomes, and the amount of reaction products becomes zero at the distance of electron transmission at which the intensity of beams becomes zero. That is, reaction products can be obtained only in the range within the specific electron transmission distance D shown in FIG. 16. Therefore, it is possible to efficiently recover reaction products by setting the electron transmission distance D at the thickness of the reaction container.

Next, a carbon-dioxide removal apparatus in which reaction efficiency is improved by enlarging the reaction production nucleus will be explained with reference to a sixth embodiment.

Sixth Embodiment

Metallic mesh materials disposed within the reaction container used in the fifth embodiment become the reaction nucleus of gases and promote the reaction between $CO_2$ and the hydrogen source. When the specific surface area (the surface area per unit volume) of the mesh material was controlled by the aperture of the mesh material and the relationship between the specific surface area and the amount of reaction products was examined by experiments, the results shown in FIG. 17 were obtained.

Figure 17:
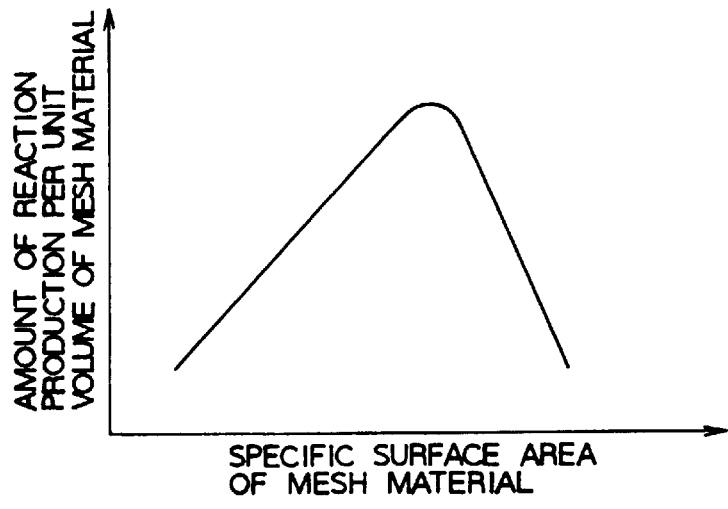
FIG. 17 is a graph showing the relationship between the specific surface area of the mesh material and the amount of reaction production per unit volume of the mesh material.

As is clear from the results shown in FIG. 17, the greater the specific surface area of the mesh material, the greater the amount of reaction products per unit volume becomes. That is, since the surface of the mesh material is the reaction nucleus of the mixed gas, the greater the specific surface area thereof, the greater the amount of reaction products. However, it also became clear at the same time that if the mesh material is very closely disposed, the amount of reaction products conversely decreases. The reason for this can be estimated that the mesh material which acts as the reaction nucleus attenuates electrons, thereby impeding the interaction between the electrons and the mixed gas.

Accordingly, as shown in FIG. 18, the reaction container 7a in which the cross-sectional area S(x) decreases from the inlet side toward the outlet side is used in the carbon-dioxide removal apparatus in accordance with the sixth embodiment. A mesh material 19c having a coarse aperture is disposed in the inlet section of the reaction container 7a, and mesh materials 19d, 19e and 19f having a fine aperture are in turn disposed toward the outlet side.

Since the filling density of the mesh material is low in the inlet section of the reaction container 7a and the cross-sectional area of the reaction container 7a is large in the apparatus of the sixth embodiment, the unreacted mixed gas 4 flows smoothly without causing pressure loss. In addition, since the cross-sectional area of the reaction container is decreased in proportion to the decrease in the volume of the mixed gas as the reaction proceeds, the pressure within the reaction container is maintained constant. Since the fine-aperture mesh materials 19d, 19e and 19f are used toward the outlet side, the amount of reaction products is constant.

According to the carbon-dioxide removal apparatus constructed as described above, the cross-sectional area S(x) of the reaction container 7a is gradually decreased in the direction of the flow of the mixed gas 4, and the aperture of the mesh materials 19c to 19f is gradually decreased in the direction of the flow thereof. Therefore, the amount of reaction products recovered can be made constant irrespective of the position X of the reaction container 7a, thereby improving the reaction efficiency as the whole reaction container 7a.

According to the carbon-dioxide removal apparatus and method in accordance with the present invention, as described above, since high energy beams are irradiated onto the hydrogen source contained in the exhaust gas, hydrogens and carbon dioxides contained in the exhaust gas are activated under conditions at close to normal temperature and normal pressure, and carbon dioxide can be reduced efficiently by the activated hydrogens.

In addition, the by-products produced, such as methanol, are industrially useful by-products which can be reused. They can be recovered easily, and there is no need to reprocess or store by-products. This method is a highly useful removal method.

In addition, by adjusting the cross-sectional area and shape of the reaction container of the carbon-dioxide removal apparatus, a decrease in pressure caused by the reaction of the mixed gas can be suppressed, and an attenuation in the intensity of high energy beams can be suppressed. Thus, reaction products can be efficiently recovered. Also, by properly adjusting the size of the aperture of the mesh material to be filled within the reaction container, the amount of reaction products can be made constant irrespective of the position of the reaction container. With the above-described arrangement, the incidence of collisions of the gases can be increased, and the interaction between the reaction components and the high energy beams can be promoted. Thus, the reaction efficiency can be increased considerably.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. An apparatus for removing carbon dioxide contained in exhaust gas, comprising:

a hydrogen supply apparatus for supplying a hydrogen source, said hydrogen source being a gas selected from the group consisting of hydrogen, methane, ethane, ethylene, acetylene and water;

a mixer for uniformly mixing the hydrogen source supplied from the hydrogen supply apparatus with exhaust gas containing carbon dioxide in order to form mixed gas;

a beam generator for generating high energy beams that are irradiated to the mixed gas from a direction perpendicular to the flow direction of the mixed gas;

a reaction container for activating the mixed gas by irradiating high energy beams from the beam generator and for causing reduction reaction of the carbon dioxide; wherein mesh materials for promoting the reduction reaction between the activated hydrogen source and carbon dioxide contained in the exhaust gas are disposed in multiple layers within the reaction container, and the cross-sectional area of the reaction container is gradually decreased in the direction of the flow of the mixed gas; and a recovery section for separating a product formed by the reduction reaction from the exhaust gas and recovering the product.

2. An apparatus for removing carbon dioxide contained in exhaust gas according to claim 1, wherein said high energy beams are electron beams having an acceleration voltage of 100 KV or above.

3. An apparatus for removing carbon dioxide contained in exhaust gas according to claim 1, wherein said high energy beams are excimer laser beams having a wavelength of 500 $\mu$m or lower.

4. An apparatus for removing carbon dioxide contained in exhaust gas according to claim 1, wherein said beam generator comprises a beam deflector for varying the direction of the high energy beam irradiation.

5. An apparatus for removing carbon dioxide contained in exhaust gas according to claim 1, wherein said recovery section is formed of a solid products recovery section and a liquid products recovery section.

6. An apparatus for removing carbon dioxide contained in exhaust gas according to claim 1, wherein said recovery section is an electric dust collector.

7. An apparatus for removing carbon dioxide contained in exhaust gas according to claim 1, wherein said mesh materials are formed of corrosion-resistant metallic wires.

8. An apparatus for removing carbon dioxide contained in exhaust gas according to claim 7, wherein irregularities are formed on the surfaces of the corrosion-resistant metallic wires which form the mesh materials.

9. An apparatus for removing carbon dioxide contained in exhaust gas according to claim 8, wherein said irregularities on the surface of the metallic wires are formed by subjecting ceramic particles to be blasted on the surfaces of the metallic wires.

10. An apparatus for removing carbon dioxide contained in exhaust gas according to claim 8, wherein said irregularities on the surfaces of the metallic wires are formed by partial ceramic-coating on the surfaces of the metallic wires.

11. An apparatus for removing carbon dioxide contained in exhaust gas according to claim 7, wherein the corrosion-resistant metallic wires are formed of stainless steel.

12. An apparatus for removing carbon dioxide contained in exhaust gas according to claim 1, wherein the size of the aperture of the mesh materials is set no smaller than 0.3 mm.

13. An apparatus for removing carbon dioxide contained in exhaust gas according to claim 1, wherein the size of the aperture of the mesh materials decreases in the direction of the flow of the mixed gas.

14. An apparatus for removing carbon dioxide contained in exhaust gas according to claim 1, wherein at least one filler selected from the group consisting of a porous member, a foaming member, a honeycomb, and a fin is disposed within the reaction container, so that the reduction reaction between the activated hydrogen source and the carbon dioxide contained in the exhaust gas is promoted.

15. An apparatus for removing carbon dioxide contained in exhaust gas according to claim 14, wherein ceramic coating is partially formed on the surface of the filler in order to form irregularities thereon.

* * * * *